US012300910B2

(12) United States Patent
Feng et al.

(10) Patent No.: US 12,300,910 B2
(45) Date of Patent: May 13, 2025

(54) ANTENNA DEVICE

(71) Applicant: ASUSTeK COMPUTER INC., Taipei (TW)

(72) Inventors: Zhi-Hua Feng, Taipei (TW); Pin-Tang Chiu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 233 days.

(21) Appl. No.: 17/954,622

(22) Filed: Sep. 28, 2022

(65) Prior Publication Data

US 2023/0198150 A1 Jun. 22, 2023

(30) Foreign Application Priority Data

Dec. 17, 2021 (TW) ................................ 110147584

(51) Int. Cl.
*H01Q 9/04* (2006.01)
*H01Q 1/22* (2006.01)
*H01Q 1/38* (2006.01)
*H01Q 1/48* (2006.01)

(52) U.S. Cl.
CPC ......... *H01Q 9/0414* (2013.01); *H01Q 1/2291* (2013.01)

(58) Field of Classification Search
CPC ............ H01Q 1/243; H01Q 1/38; H01Q 1/48; H01Q 9/42; H01Q 13/10; H01Q 1/2291; H01Q 5/371
See application file for complete search history.

(56) References Cited

U.S. PATENT DOCUMENTS

| | | | | |
|---|---|---|---|---|
| 9,917,346 B2 * | 3/2018 | Ramachandran | ...... H01Q 21/28 | |
| 11,264,699 B2 | 3/2022 | Chang et al. | | |
| 2012/0206302 A1 * | 8/2012 | Ramachandran | ........ H01Q 1/22 | 343/866 |
| 2014/0203974 A1 * | 7/2014 | Liu | ..................... H01Q 1/2266 | 343/702 |
| 2014/0225787 A1 * | 8/2014 | Ramachandran | ...... H01Q 13/10 | 343/702 |

(Continued)

FOREIGN PATENT DOCUMENTS

| | | |
|---|---|---|
| CN | 103943959 A | 7/2014 |
| CN | 111355018 A | 6/2020 |

(Continued)

*Primary Examiner* — Wei (Victor) Y Chan
(74) *Attorney, Agent, or Firm* — McClure, Qualey & Rodack, LLP

(57) ABSTRACT

An antenna device disposed on a side frame of a metal case. The antenna device includes a first slot, a dielectric substrate, a feeding metal portion, a ground portion, and a feeding source. The first slot is on the side frame, so that a part of the side frame surrounded by the first slot serves as a radiating metal portion. The dielectric substrate includes a first surface and a second surface and is disposed on the radiating metal portion through the first surface. The feeding metal portion is on the second surface of the dielectric substrate, so that a vertical projection of the feeding metal portion overlaps with the radiating metal portion. The ground portion is on the second surface of the dielectric substrate and connected to the metal case. The feeding source is on the second surface and connected to the feeding metal portion and the ground portion.

7 Claims, 6 Drawing Sheets

(56) References Cited

U.S. PATENT DOCUMENTS

| | | | | |
|---|---|---|---|---|
| 2014/0347227 | A1 | 11/2014 | Devis et al. | |
| 2015/0029068 | A1 * | 1/2015 | Toyao | H01Q 5/385 343/770 |
| 2017/0005414 | A1 | 1/2017 | Yang | |
| 2018/0219297 | A1 * | 8/2018 | Chen | H01Q 7/00 |
| 2018/0351254 | A1 * | 12/2018 | Yen | H01Q 13/10 |
| 2020/0203834 | A1 * | 6/2020 | Asaf | H01Q 9/0435 |
| 2022/0021105 | A1 * | 1/2022 | Hsu | H01Q 1/243 |
| 2022/0021122 | A1 * | 1/2022 | Miller | H01Q 13/18 |
| 2023/0361449 | A1 * | 11/2023 | Hsu | H01Q 9/045 |
| 2023/0361450 | A1 * | 11/2023 | Hsu | H01Q 13/10 |
| 2023/0361487 | A1 * | 11/2023 | Hsu | H01Q 1/243 |

FOREIGN PATENT DOCUMENTS

| | | | |
|---|---|---|---|
| TW | 201703350 | A | 1/2017 |
| TW | 201834312 | A | 9/2018 |
| TW | 202023108 | A | 6/2020 |

* cited by examiner

ANTENNA DEVICE

CROSS-REFERENCE TO RELATED APPLICATION

This application claims the priority benefit of Taiwan Application Serial No. 110147584, filed on Dec. 17, 2021. The entirety of the above-mentioned patent application is hereby incorporated by reference herein and made a part of specification.

BACKGROUND OF THE INVENTION

Field of the Invention

The disclosure relates to an antenna device incorporating a slot on a metal case.

Description of the Related Art

Since cases of products are mainly made of metal, impact is usually caused to a built-in antenna environment by shielding of the metal case. Changing the antenna environment, for example, forming a window on the metal case, typically increases a mechanism cost. In addition, if a slot is provided on the metal case to form a slot antenna, a width in a range of 2.5-3.5 mm is usually required. The design affects an overall appearance, requires an additional packaging design, and requires a relatively large antenna.

The above two manners affect the mechanism cost and the overall appearance. However, if an antenna is designed directly in the metal case rather than in the above two manners, performance of the antenna is generally very poor, impeding receipt and transmission of a signal by the antenna.

BRIEF SUMMARY OF THE INVENTION

The disclosure provides an antenna device. The antenna device is disposed on a side frame of a metal case. The antenna device includes a first slot, a dielectric substrate, a feeding metal portion, a ground portion, and a feeding source. The first slot is located on the side frame, so that a part of the side frame surrounded by the first slot serves as a radiating metal portion. The dielectric substrate includes a first surface and a second surface, and is disposed on the radiating metal portion through the first surface. The feeding metal portion is located on the second surface of the dielectric substrate, so that a vertical projection of the feeding metal portion overlaps with the radiating metal portion. The ground portion is located on the second surface of the dielectric substrate and is electrically connected to the metal case. The feeding source is electrically connected to the feeding metal portion and the ground portion.

The disclosure provides another antenna device. The antenna device is disposed on a side frame of a metal case, and includes a first slot and a feeding point. The first slot is located on the side frame, so that a part of the side frame surrounded by the first slot serves as a radiating metal portion. The feeding point is located on the radiating metal portion.

Based on the above, in the disclosure, a narrow slot is directly designed on the side frame of the metal case, and an antenna structure design of coupling feeding or direct feeding is used, to assist or excite radiation of the side frame. In this way, a required space is significantly reduced, and receipt and transmission of a signal are realized. Therefore, in the disclosure, an antenna window is not required on the metal case, and desirable antenna performance is still maintained while impact of a slit of the slot on an appearance is not minimized.

DETAILED DESCRIPTION OF THE EMBODIMENTS

Figure 1:
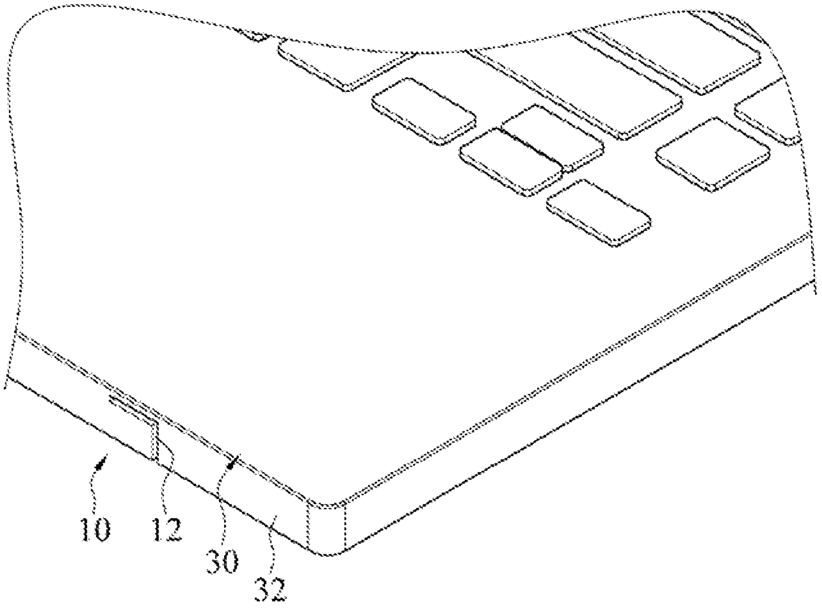
FIG. 1 is a schematic outside view in which an antenna device is mounted to a metal case according to an embodiment of the disclosure.

Embodiments of the disclosure are described with reference to relevant drawings. In the drawings, same or similar elements or circuits are denoted by same reference numerals. It should be understood that the terms such as "first" and "second" used in this specification are used for describing various elements, parts, regions, or functions, but such elements, parts, regions and/or functions are not limited by the terms. The terms are used merely for distinguishing one elements, part, region, or function from another elements, part, region, or function.

Figure 2:
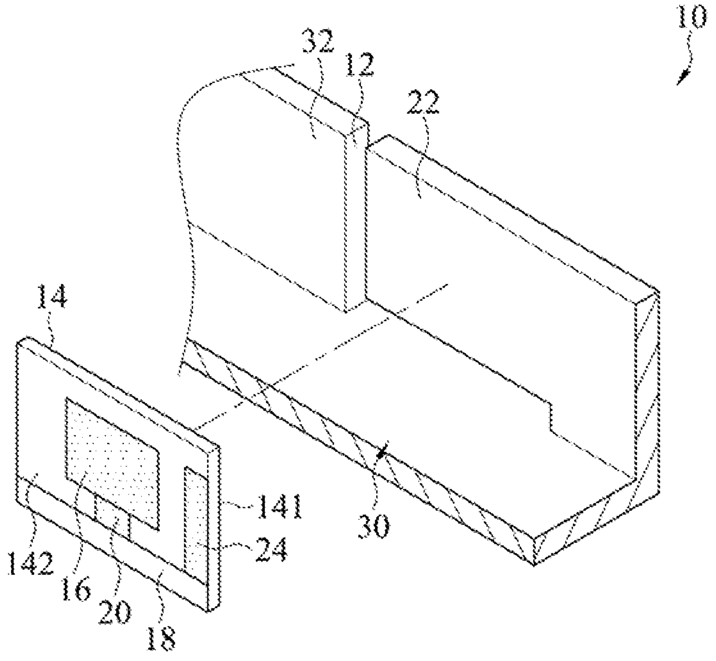
FIG. 2 is a schematic structural view of the antenna device before assembly according to an embodiment of the disclosure.
Figure 3:
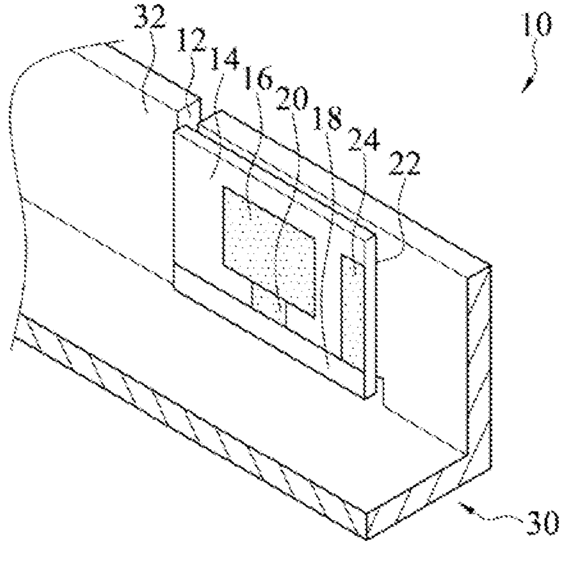
FIG. 3 is a schematic structural view of the antenna device after assembly according to an embodiment of the disclosure.

Referring to FIG. 1, FIG. 2, and FIG. 3, an antenna device 10 includes a first slot 12, a dielectric substrate 14, a feeding metal portion 16, a ground portion 18, and a feeding source 20. The antenna device 10 is located on a side frame 32 of a metal case 30 to receive and transmit a radio frequency signal.

In an embodiment, the metal case 30 is a screen metal back cover (referred to as a piece A) of an electronic device, a keyboard metal cover (referred to as a piece C) of the electronic device, a keyboard metal substrate (referred to as a piece D) of the electronic device, or the like. In the foregoing embodiment, the electronic device is a notebook computer, but the disclosure is not limited thereto.

As shown in FIG. 1, FIG. 2, and FIG. 3, in the antenna device 10, the first slot 12 is located on the side frame 32 of the metal case 30. In this embodiment, the first slot 12 is an L-shaped slot, and a part of the side frame 32 surrounded by the first slot 12 serves as a radiating metal portion 22, so that the radiating metal portion 22 serves as an antenna radiating path by using the first slot 12. The dielectric substrate 14 includes a first surface 141 and a second surface 142. The dielectric substrate 14 is vertically placed in the metal case 30, and the first surface 141 faces the radiating metal portion 22, so that the dielectric substrate 14 is disposed on the radiating metal portion 22 through the first surface 141. In an embodiment, the dielectric substrate 14 is attached to the side frame 32 by an adhesive or a double-sided tape. The feeding metal portion 16 is located on the second surface 142 of the dielectric substrate 14, so that a vertical projection of the feeding metal portion 16 overlaps with the radiating metal portion 22. The ground portion 18 is located on an edge of the second surface 142 of the dielectric substrate 14, and the ground portion 18 is electrically connected to the metal case 30 and is grounded. The feeding source 20 is located on the second surface 142 of the dielectric substrate 14. One end of the feeding source 20 is electrically connected to the feeding metal portion 16, and an other end is electrically connected to the ground portion 18, so as to receive or transmit a radio frequency signal by using the feeding source 20.

In an embodiment, in order to enhance a high frequency mode, in the disclosure, a metal branch 24 is further disposed on the dielectric substrate 14. The metal branch 24 is located on the second surface 142 of the dielectric substrate 14 and on a side of the feeding metal portion 16, and one end of the metal branch 24 is connected to the ground portion 18. In another embodiment, an other end of the metal branch 24 is further connected to the feeding metal portion 16.

In an embodiment, the dielectric substrate 14 is a printed circuit board (PCB) or a plastic substrate, but the disclosure is not limited thereto. Any substrate on which the feeding metal portion 16, the ground portion 18, and the metal branch 24 are formed serves as the dielectric substrate 14 in the disclosure.

In the antenna device 10, a signal is coupled and fed to the radiating metal portion 22 at a proper position through the feeding metal portion 16 on the dielectric substrate 14, so as to design a coupled loop antenna. A thickness of the dielectric substrate 14 is equal to a coupling distance between the feeding metal portion 16 and the radiating metal portion 22. Therefore, in the disclosure, the thickness of the dielectric substrate 14 is changed and a distance between the dielectric substrate and the side frame 32 (the radiating metal portion 22) is increased or reduced, to adjust matching of an antenna mode. In addition, a required frequency mode is alternatively added by extending the ground portion 18 or the metal branch 24. Correspondingly, a size of the dielectric substrate 14 is adjusted to form the antenna device 10 configured for multi-band operation.

Figure 4:
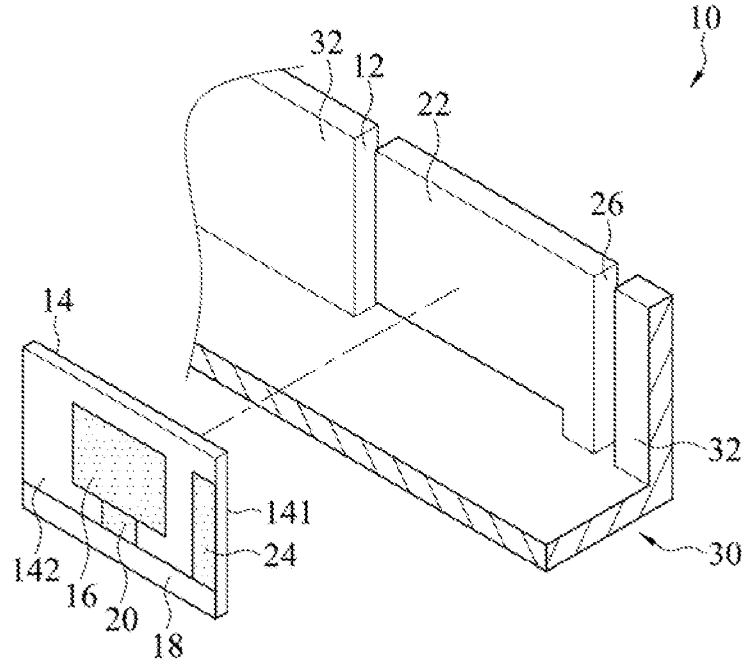
FIG. 4 is a schematic structural view of an antenna device before assembly according to another embodiment of the disclosure.
Figure 5:
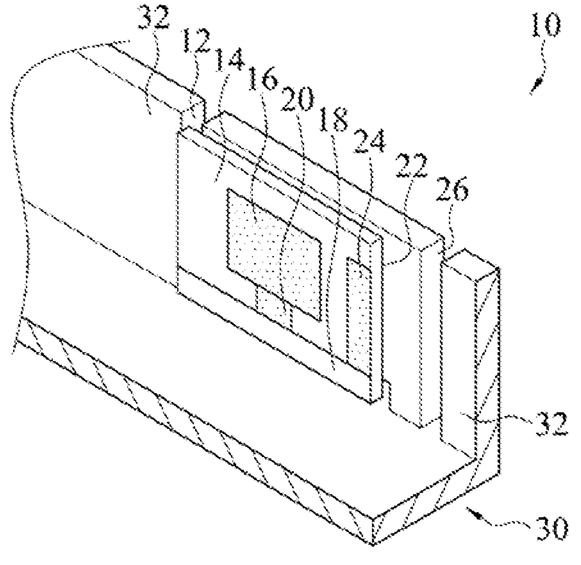
FIG. 5 is a schematic structural view of the antenna device after assembly according to another embodiment of the disclosure.

Referring to FIG. 4 and FIG. 5, in the antenna device 10, the first slot 12 is located on the side frame 32 of the metal case 30, and a second slot 26 is further provided on the side frame 32 on a side of the first slot 12. In this embodiment, the first slot 12 is an L-shaped slot, the second slot 26 is an I-shaped slot, and a part of the side frame 32 surrounded by the first slot 12 and the second slot 26 serves the radiating metal portion 22. That is to say, the first slot 12 and the second slot 26 are located on a periphery of the radiating metal portion 22 in correspondence to each other, so that the radiating metal portion 22 serves as a radiating path of an inverted-F antenna (IFA) by using the first slot 12 and the second slot 26. The dielectric substrate 14 is disposed on the radiating metal portion 22 through the first surface 141, and the feeding metal portion 16, the ground portion 18, the feeding source 20, and the metal branch 24 are disposed on the second surface 142 of the dielectric substrate 14, so that the vertical projection of the feeding metal portion 16 overlaps with the radiating metal portion 22. The ground portion 18 is electrically connected to the metal case 30, the feeding source 20 is electrically connected to the feeding metal portion 16 and the ground portion 18, and the metal branch 24 located on the side of the feeding metal portion 16 is connected to the ground portion 18.

In an embodiment, a length of the metal branch 24 is adjustable, the one end of the metal branch 24 is connected to the ground portion 18, and a point to which the other end is to be connected varies accordingly with an antenna pattern. In an embodiment, the other end of the metal branch 24 is an open end (as shown in FIG. 2 and FIG. 3). Alternatively, the other end of the metal branch 24 vertically extends and is connected to the feeding metal portion 16 (not shown).

In an embodiment, as shown in FIG. 2 to FIG. 5, the feeding metal portion 16, the ground portion 18, and the metal branch 24 are formed on the second surface 142 of the dielectric substrate 14 by printing. In an embodiment, the dielectric substrate 14 and the feeding metal portion 16, the ground portion 18 and the metal branch 24 thereon are a PCB having an antenna pattern printed thereon.

In an embodiment, as shown in FIG. 2 to FIG. 5, the feeding metal portion 16, the ground portion 18, and the metal branch 24 is made of a conductive material. The conductive material is silver, copper, iron, aluminum, an alloy thereof, or the like, but the disclosure is not limited thereto.

Figure 6:
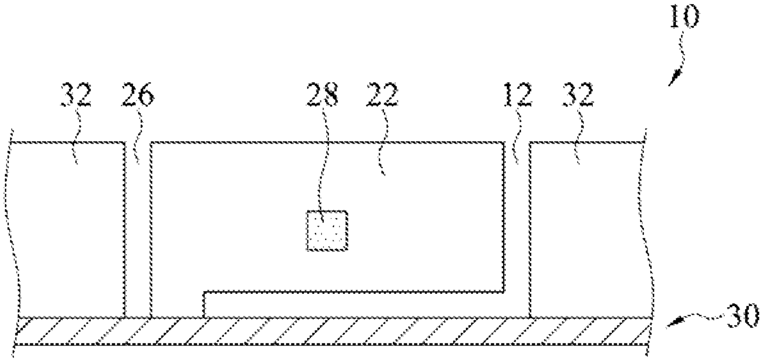
FIG. 6 is a schematic planar structural view of an antenna device according to still another embodiment of the disclosure.
Figure 7:
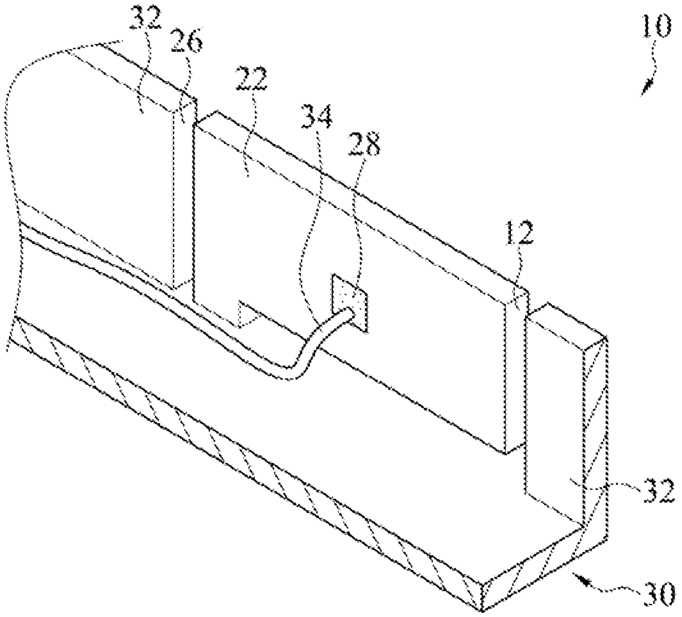
FIG. 7 is a schematic structural view of the antenna device according to still another embodiment of the disclosure.

Referring to FIG. 6 and FIG. 7, an antenna device 10 is disposed on a side frame 32 of a metal case 30. The antenna device 10 includes a first slot 12, a second slot 26, and a feeding point 28. The first slot 12 is located on the side frame 32, and the second slot 26 is also located on the side frame 32 and on a side of the first slot 12, so that a part of the side frame 32 surrounded by the first slot 12 and the second slot 26 serves as a radiating metal portion 22. That is to say, the first slot 12 and the second slot 26 are located on a periphery of the radiating metal portion 22 in correspondence to each other. In this embodiment, the first slot 12 is an L-shaped slot, the second slot 26 is an I-shaped slot, and the first slot 12 and the second slot 26 are disposed around the radiating metal portion 22 in correspondence to each other, so that the radiating metal portion 22 serves as a radiating path of an IFA by using the first slot 12 and the second slot 26. The feeding point 28 is located on the radiating metal portion 22, may be directly electrically connected to a signal line 34, and serves as a feeding source for receiving and transmitting signals by direct feeding.

Figure 8:
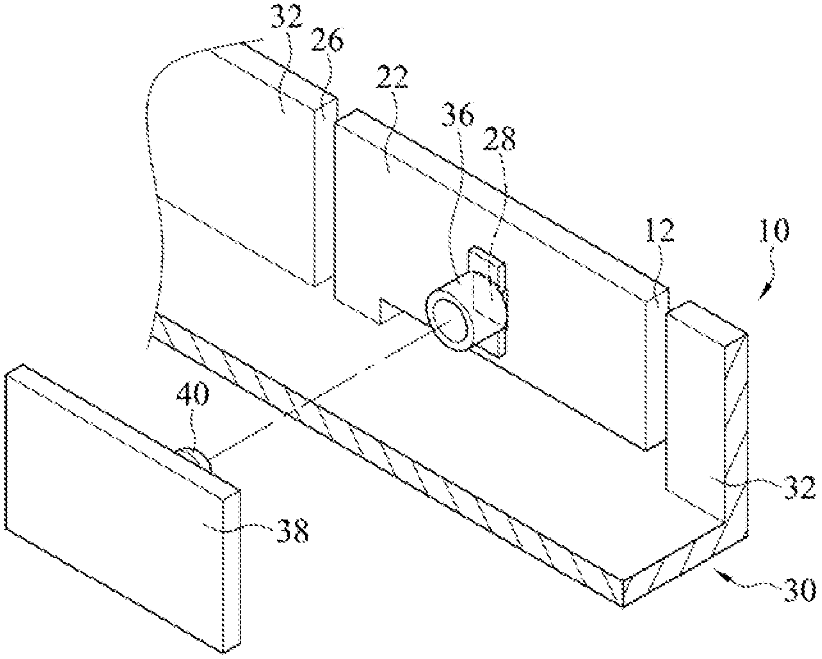
FIG. 8 is a schematic structural view of an antenna device before assembly according to yet another embodiment of the disclosure.
Figure 9:
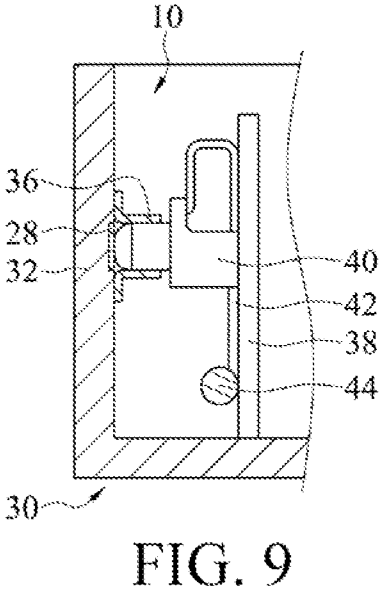
FIG. 9 is a schematic structural view of the antenna device after assembly according to yet another embodiment of the disclosure.

Referring to FIG. 8 and FIG. 9, an antenna device 10 is disposed on a side frame 32 of a metal case 30. The antenna device 10 includes a first slot 12, a second slot 26, a feeding point 28, a metal fixture 36, a dielectric substrate 38, a metal elastic piece 40, a conductive circuit 42, and a feeding source 44. The first slot 12 is located on the side frame 32 of the metal case 30, and the second slot 26 is also located on the side frame 32 and on a side of the first slot 12, so that a part of the side frame 32 surrounded by the first slot 12 and the second slot 26 serves as a radiating metal portion 22. The feeding point 28 is located on the radiating metal portion 22, the metal fixture 36 is disposed on the feeding point 28, and the feeding point 28 is electrically connected to the metal fixture 36. The metal elastic piece 40, the conductive circuit 42, and the feeding source 44 are disposed on the dielectric substrate 38. The conductive circuit 42 is electrically connected to the metal elastic piece 40 and the feeding source 44, and the dielectric substrate 38 is vertically placed in the metal case 30 and faces the radiating metal portion 22, so as to be fixed to the metal fixture 36 by the metal elastic piece 40. In this way, the feeding source 44 is electrically connected to the feeding point 28 by the conductive circuit 42, the metal elastic piece 40, and the metal fixture 36 to serve as a direct feeding path. In an embodiment, the feeding source 44 is a coaxial cable connector, and is configured to be connected to a coaxial cable, so as to transmit or receive a radio frequency signal by using the feeding source 44.

As shown in FIG. 2 and FIG. 3, in order to maintain structural strength of the side frame 32 of the metal case 30, the first slot 12 is filled with a non-conductive material (not shown). As shown in FIG. 4 to FIG. 8, in order to maintain the structural strength of the side frame 32 of the metal case 30, the first slot 12 and the second slot 26 are filled with a non-conductive material (not shown).

Referring to FIG. 2 and FIG. 3, in the disclosure, the feeding metal portion 16 on the dielectric substrate 14 is located above the first slot 12, and the radiating metal portion 22 is used, to excite the coupled loop antenna formed by the metal side frame 32 (the radiating metal portion 22), so as to form a first resonance mode. In addition, by using the design of the metal branch 24, a high frequency mode is supplemented, so as to add a second resonance mode. An antenna device 10 with a first slot 12 having a width of 2 mm, a length of 22 mm, and a height of 10 mm and a dielectric substrate 14 having a thickness of 2 mm is used as an embodiment for specific experimental simulation.

Figure 10:
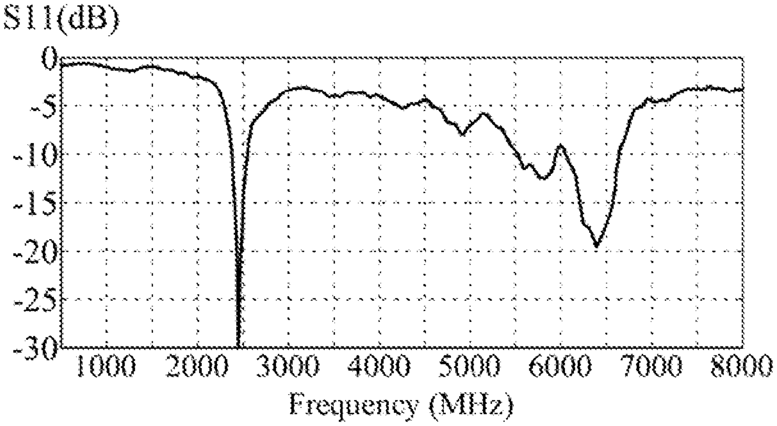
FIG. 10 is a schematic diagram of simulation of an S parameter generated by the antenna device at a specific frequency according to the disclosure.
Figure 11:
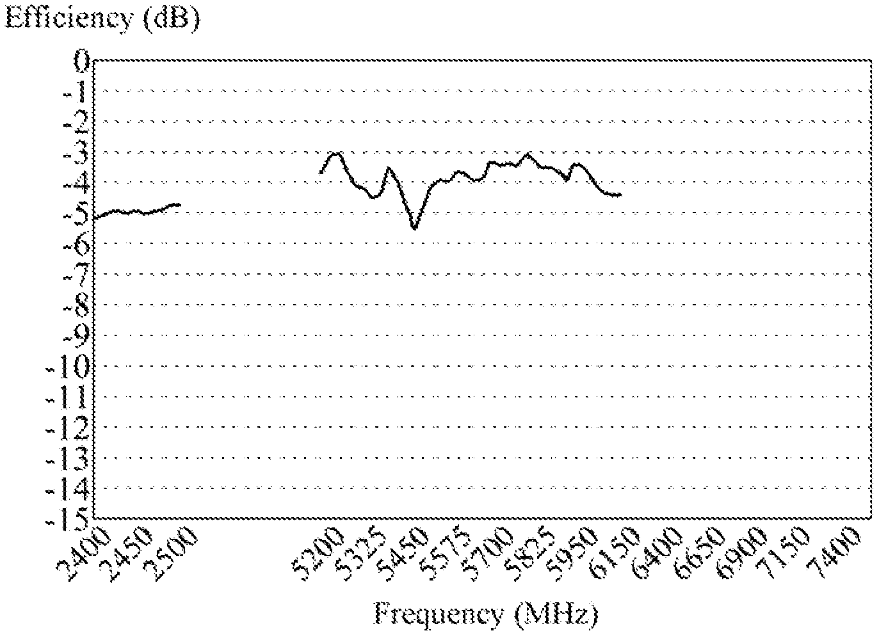
FIG. 11 is a schematic diagram of simulation of a radiation efficiency of the antenna device at a specific frequency according to the disclosure.

Referring to FIG. 10 and FIG. 11, simulation of an S parameter (S11) and an antenna efficiency is performed with the antenna device 10 in FIG. 3. A result of the simulation of the S parameter of the antenna device 10 when operating in a low operating frequency band and a high operating frequency band is shown in FIG. 10. It is learned from a curve shown in the diagram that reflection coefficients (S11) of a low-frequency resonance mode and a high-frequency resonance mode shown in the diagram are both less than −10 dB (S11<−10 dB), indicating that the reflection coefficients are desirable in both the low operating frequency band and the high operating frequency band. As shown in FIG. 11, antenna radiation efficiencies in a 2400 MHz (2.4 GHz) frequency band and an operating frequency band above 5200 MHz (5.2 GHz) are up to about −4 dB to −5 dB, indicating that the antenna radiation efficiency of the antenna device 10 is quite desirable.

Based on the above, in the disclosure, a narrow slot (having a width of 1-2 mm wide and a length of 10-25 mm) is directly designed on the side frame of the metal case, and an antenna structure configured for coupling feeding (the antenna device shown in FIG. 2 to FIG. 5) or an antenna structure configured for direct feeding (the antenna device shown in FIG. 6 to FIG. 9) is used, to assist or excite radiation of the side frame (the radiating metal portion). In this way, a required space is significantly reduced, and receipt and transmission of a signal are realized. Therefore, in the disclosure, an antenna window is not required on the metal case, and desirable antenna performance is still maintained while impact of a slit of the slot on an appearance is not minimized.

The foregoing embodiments are merely for describing the technical ideas and the characteristics of the disclosure, and are intended to enable a person skilled in the art to understand and implement the content of the disclosure. However, the scope of claims of the disclosure is not limited thereto. In other words, equivalent changes or modifications made according to the spirit disclosed in the disclosure shall still fall into the scope of claims of the disclosure.

What is claimed is:

1. An antenna device, disposed on a side frame of a metal case, the antenna device comprising:
- a first slot, located on the side frame, so that a part of the side frame surrounded by the first slot serves as a radiating metal portion;
- a dielectric substrate, comprising a first surface and a second surface and disposed on the radiating metal portion through the first surface;
- a feeding metal portion, located on the second surface of the dielectric substrate, so that a vertical projection of the feeding metal portion overlaps with the radiating metal portion;
- a ground portion, located on the second surface of the dielectric substrate and electrically connected to the metal case; and
- a feeding source, electrically connected to the feeding metal portion and the ground portion;
- wherein the feeding metal portion cooperates with the radiating metal portion to excite the coupled loop antenna formed by the radiating metal portion, so as to form a resonance mode.

2. The antenna device according to claim 1, further comprising a metal branch located on the second surface of the dielectric substrate and on a side of the feeding metal portion, wherein one end of the metal branch is connected to the ground portion.

3. The antenna device according to claim 2, wherein an other end of the metal branch is further connected to the feeding metal portion.

4. The antenna device according to claim 1, wherein the first slot is an L-shaped slot.

5. The antenna device according to claim 3, further comprising a second slot located on the side frame and on a periphery of the radiating metal portion in correspondence to the first slot.

6. The antenna device according to claim 5, wherein the second slot is an I-shaped slot.

7. An antenna device, disposed on a side frame of a metal case, the antenna device comprising:
- a first slot, located on the side frame, so that a part of the side frame surrounded by the first slot serves as a radiating metal portion;
- a dielectric substrate, comprising a first surface and a second surface and disposed on the radiating metal portion through the first surface;
- a feeding metal portion, located on the second surface of the dielectric substrate, so that a vertical projection of the feeding metal portion overlaps with the radiating metal portion;
- a ground portion, located on the second surface of the dielectric substrate and electrically connected to the metal case;
- a feeding source, electrically connected to the feeding metal portion and the ground portion; and
- a metal branch, located on the second surface of the dielectric substrate and on a side of the feeding metal portion, wherein one end of the metal branch is connected to the ground portion.

* * * * *